United States Patent
Sheridon

[15] 3,661,438
[45] May 9, 1972

[54] HOLOGRAPHIC DATA STORAGE AND RETRIEVAL SYSTEM

[72] Inventor: Nicholas K. Sheridon, Fairport, N.Y.
[73] Assignee: Xerox Corporation, Rochester, N.Y.
[22] Filed: Dec. 12, 1969
[21] Appl. No.: 884,418

[52] U.S. Cl. .................350/3.5, 350/160 R, 350/161
[51] Int. Cl. ...........................................G02b 27/22
[58] Field of Search ...................350/3.5, 96 B, 160, 161

[56] References Cited

UNITED STATES PATENTS

| | | | |
|---|---|---|---|
| 3,498,690 | 3/1970 | Tyler | 350/3.5 |
| 3,551,018 | 12/1970 | Stetson | 350/3.5 |
| 3,501,221 | 3/1970 | Lohmann | 350/3.5 |

*Primary Examiner*—David Schonberg
*Assistant Examiner*—Robert L. Sherman
*Attorney*—James J. Ralabate, David C. Petre and Michael H. Shanahan

[57] ABSTRACT

A holographic data storage and retrieval system, wherein by stacking a plurality of surface recorded flat base members and by edge illumination thereof by a coherent light source, a high density holographic image of the plurality of stacked base members can be produced. For readout a similar coated base member would be utilized in the presence of a reconstructing coherent light source to form a readable output image on a surface coating on said base member.

13 Claims, 4 Drawing Figures

HOLOGRAPHIC DATA STORAGE AND RETRIEVAL SYSTEM

BACKGROUND OF THE INVENTION

It has long been recognized that photographic emulsions, xerographic thermoplastics and other materials are capable of storing huge amounts of information. The problem to date has been to provide rapid access to the information and to store it in such a manner that small and nearly inevitable imperfections in the recording material, such as dust, scratches, etc., will not cause a loss of substantial information. The present state of the art teaches no practical method of storing information on high quality materials that will both begin to make full use of the information storage capabilities of the above materials and meet such requirements.

OBJECTS

It is, accordingly, an object of the present invention to provide a high density holographic data storage and retrieval system.

It is another object of the present invention to increase the efficiency of recording information in a holographic recording system.

It is another object of the present invention to provide an easily replicable high information density holographic record.

BRIEF SUMMARY OF THE INVENTION

In accomplishing the above and other desired aspects of the present invention, applicant has invented improved apparatus and methods for high density recording in a holographic data storage and retrieval system. Each document or picture to be recorded is demagnified onto the sensitized coating of a thin sheet of transparent material, herein called a slab light pipe. The slab light pipes are stacked together and illuminated with diffuse laser light. Light will enter one end of the slab light pipe, undergo numerous reflections therein, and leave the opposite end carrying the picture information in a "jumbled-up" form. This light is recorded on a photosensitive plate along with a reference coherent light beam, making a hologram. This hologram contains the picture information carried by all the slab light pipes.

To retrieve the stored information, a single output slab light pipe is utilized with a special coating on one surface. The hologram is illuminated by a beam of coherent light, identical to the reference beam used to make the hologram, but propagating in the opposite direction. This creates a real image wavefield identical to that which came from the stack of slab light pipes during exposure but propagating in the opposite direction. To reconstruct a given image, the readout slab light pipe is placed in a position corresponding to that occupied by the input slab light pipe containing the given picture during recording. The reconstructed wave fronts will enter this slab light pipe and the required image will appear on the coated surface of the readout slab light pipe. This image is then magnified by any known optical system for reading.

DESCRIPTION OF THE DRAWINGS

For a more complete understanding of the invention, as well as other objects and further features thereof, reference may be had to the following detailed description in conjunction with the drawings wherein:

FIG. 3 is a diagram showing the structure of one of the input slab light pipes.

DETAILED DESCRIPTION OF THE INVENTION

The following describes a holographic system that possesses an information storage density approaching that of available recording media and that provides ready access to this information. The information is stored in a redundant manner which makes it nearly immune to losses due to defects such as dust, scratches, etc., which occur on prior art microimage members.

The most obvious approach to the problem of holographic information storage is to make a hologram of a mosaic of minified pictures. By making the pictures smaller and moving the mosaic correspondingly closer to the hologram recording plate, to provide an angular aperture great enough to record the increasing spatial frequencies, the only limit to the number of pictures that can be recorded is the resolution limit of the recording medium. Such a system is not practical, however, because the images would be difficult to locate, i.e., index, in the reconstruction and because the optical system needed to enlarge the images for reading would be prohibitively expensive.

Accordingly, the reconstructed images and thus the pictures used to make the hologram could be about the same size as microfilm images, that is, about one-half inch square. The further that these pictures are placed from the holographic surface during the recoding process, the more that can be recorded, but this distance is limited by the resolving power of the hologram aperture. Assuming, for example, a 20 to 1 reduction, if the information in the original picture had a spatial frequency of 20 lines per millimeter, its reduced version would have a spatial frequency of 400 lines per millimeter. To resolve the image of this minified picture with a 4 by 5 inch hologram only a few hundred pictures could be recorded at most. In addition, finding the reconstructed image of a given picture would require a complicated two dimensional indexing system.

Thus, a straight forward approach to the hologram information storage and retrieval problem does not yield an attractive system. The basic problem of producing large enough images to keep the cost of the readout system within reason, and still providing a large storage capacity is common to both holographic and conventional information storage systems. The problem of indexing the images is perhaps a little simpler in conventional systems, where sequential recordings on film strips are appropriate. However, the holographic information storage and retrieval system that follows allows for high density information storage with rapid and manageable retrieval thereof.

Figure 1:
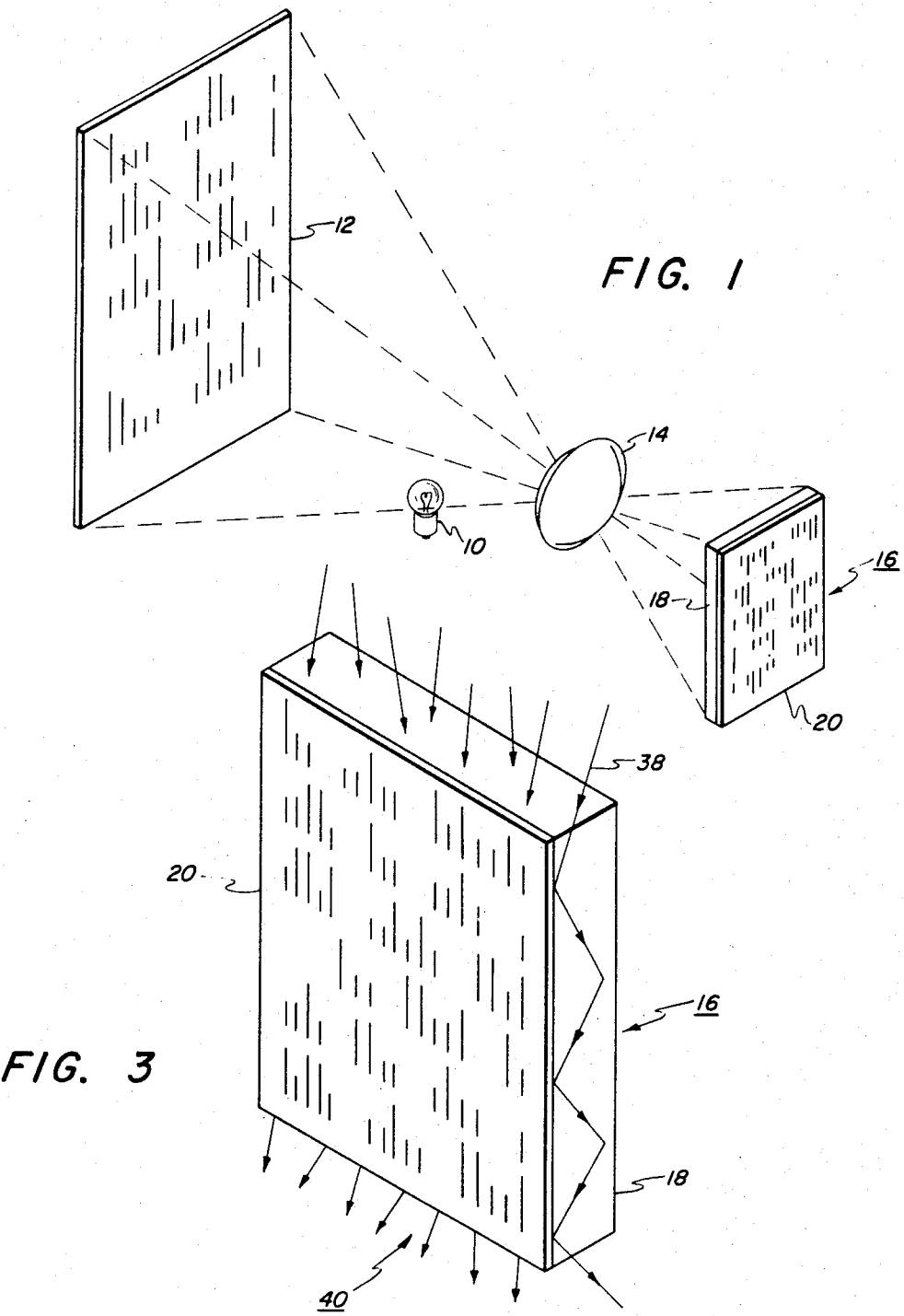
FIG. 1 is a representative diagram showing the recording process onto one of the input slab light pipes.

FIG. 1 shows the technique of recording a printed document onto the input slab light pipe, which is a thin sheet of transparent material 18 having a light sensitive coating 20. A light or scanning source 10, of any type, would illuminate the document 12 and the information modulated light reflected (or transmitted if the document 12 were a transparency) therefrom would be gathered by lens 14 and focused onto the light sensitive surface 20 of the input slab light pipe 16. In order to increase the amount of information to be recorded on a single hologram, the image of the document 12 would be demagnified by a factor of, for example, 20. If the light source 10 were of a coherent nature and used in conjunction with a mutually coherent reference beam the optical information could be recorded on the coating 20 as a hologram. The use of lens 14 would then not be necessary. A separate input slab light pipe would be necessary for each page or document to be recorded on the hologram. Each of the input slab light pipes 16 could be approximately one-half inch square and perhaps four-thousandths of an inch thick. A 4 by 5 inch hologram could thus record the information on 10,000, 10-inch square pictures. Three such holograms could record an entire encyclopedia, for example, and could easily be replicated for generation of additional holograms with existing techniques in the holographic art.

An alternate way of recording document information on the slab light pipe is by means of a mechanical image transfer process, such as a xerographic dry process, or a stamping process, in which the image is formed by the transfer of materials to the slab light pipe or by the mechanical disturbances of the surface of the slab light pipe.

The information to be recorded on the slab light pipes is not limited to that of an optical nature, but includes that which may be written with an acoustic field, an electron beam or a magnetic field or other forms of non-radiant energy. The information so written on the input slab light pipes will modify an optical property of coating 20 which will in turn modify the recording light in the slab.

Figure 2:
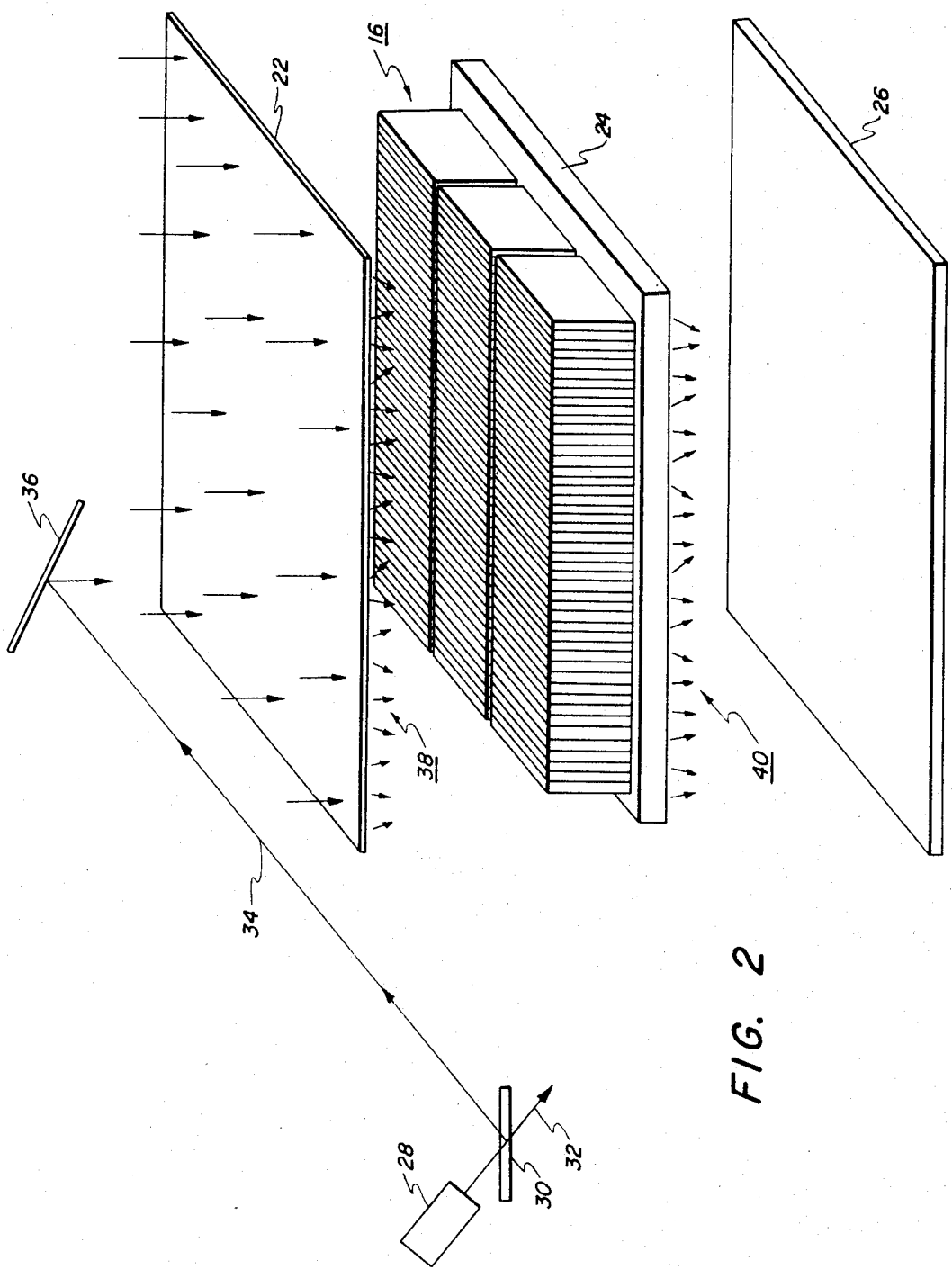
FIG. 2 is a representative diagram of the stacked light pipes generating the hologram on the holographic plate.

All of the input slab light pipes 16, after being recorded with the minified images of the pictures or documents to be stored would be stacked together as shown in FIG. 2. For purposes of illustration, the dimensions in FIG. 2 are shown to be exaggerated. Adjacent to but not necessarily resting on the top edge of the stacks of input slab light pipes 16, would be a light diffuser 22 such as a sheet of ground glass. The diffuser 22 would be illuminated by a source of coherent light illumination as from laser source 28. The laser beam 34 would impinge upon mirror 36 to provide the diffuser 22 with the source of coherent illumination. The reference beam 32 from laser source 28 would also be used to illuminate the holographic plate 26, in this case shown to be transmitted through beamsplitter 30. The light or object beam 34 would be diffused by diffuser 22 and the diffused light 38 would enter one end of each of the slab light pipes 16, undergo numerous reflections therein, and leave the opposite end carrying the picture information in each of the slab light pipes in accordance with the information recorded on each of the light pipes. The information modulated light beams 40 would now be recorded on the photosensitive holographic plate 26 along with the reference beam 32 as hereinabove set forth. The hologram 26 now contains the picture information carried by all the input slab light pipes 16. The holographic plate 26 could be a photographic plate, for example, as is well known in the art.

If the holographic plate 26 is, for example, a 4 by 5 inch surface, then the distance between the stacks of slab light pipes 16 and the holographic plate 26 could be on the order of one-half inch in order to record all the information while maintaining adequate redundancy by allowing light from each slab light pipe to cover a large area of the hologram. An optical flat 24 is placed in contact with the lower surface of the input slab light pipes. This optical flat 24 is first coated with a liquid having the same refractive index as the base material of the slab light pipes. This optical flat 24 serves as a substitute for having an accurate optical finish on the exit ends of the slab light pipes. One skilled in the art could, if desired however, instead grind the exit ends of the slab light pipes for said optical finish.

The input slab light pipes 16 in FIGS. 1 and 2 are shown in detail in conjunction with FIG. 3. Each slab light pipe consists of a transparent base material 18 with a light sensitive coating 20 on one side. In one embodiment of the present invention the light sensitive coating could be a material whose optical attenuation changes upon exposure to light which is preferably of a different wavelength than that of the light used to record the hologram. Hence the minified image of the document would be recorded as a variable attenuation of the coating 20. It could, for example, be transparent to the hologram recording light where unexposed and opaque where sufficiently exposed. The refractive index of the coating 20 would be ideally but not necessarily the same as that of the base 18. Hence light entering the top of the slab light pipe would be reflected (at a great enough angle so total internal reflection takes place) from the distal surface of the coating 20 in the transparent areas, and partly or completely absorbed before and after reflection in the more opaque areas. Equivalently, the distal surface of coating 20 might be mechanically disturbed with image information causing light to scatter out of the slab light pipe rather than be reflected. In a second embodiment of this invention, coating 20 would initially have a lower refractive index than that of base 18 but would change its refractive index towards that of base 18 upon exposure to light of a wavelength other than that used to record the hologram. That is, the minified image of the document to be recorded on the surface of the slab light pipe is to be primarily a phase modulating image rather than the more common photograph-like attenuation or amplitude modulating image. Additionally, the coating 20 could also be uniformly attenuating to the hologram recording light. Light entering the top of the slab light pipe at a sufficiently low angle would then undergo total internal reflection from the interface between coating 20 and base 18 in those areas where coating 20 had not been exposed to image light, and would be transmitted (or "leaked" into) coating 20 and subsequently absorbed in those areas where coating 20 had been exposed to image light and consequently had changed its refractive index to a value close to that of base 18. In a third embodiment of the present invention the coating 20 would normally have the same refractive index as that of the base 18, but when exposed to light other than that used to expose the hologram the refractive index would change, preferably to some lower value. As in the previous case the image of the document is a refractive index or phase modulating image, and as before the coating 20 could be attenuating to the light used to record the hologram. In those areas where the refractive index of coating 20 is lower than that of the base 18 light striking the interface between base 18 and coating 20 will undergo total internal reflection. Where the refractive index of coating 20 had not been changed, light from base 18 would enter and be absorbed. (In the case where the document which is recorded as a refractive index image in coating 20 is typewritten or printed material a negative image of said document will normally be used to form the image so as to increase the amount of totally reflecting surface within the slab light pipe.) Common to all these embodiments is the modulation of light in the slab light pipe by an image recording on coating 20 which is attenuating to light in its effect. It may be necessary to coat the heretofore uncoated side of the slab light pipe with either a good light reflector or with a material having a much lower refractive index than that of the material of the base 18 and light absorbing to more efficiently reflect light and thereby minimize crosstalk between adjacent slab light pipes.

The picture information on the surface of a slab light pipe is recorded on the hologram 26 in FIG. 2 by illuminating the slab light pipe at one end by diffuse coherent light as set forth above. As seen in FIG. 3 the diffuse light 38 from the ground glass or diffuser 22 would enter the end of the slab light pipe and propagate down it by a series of reflections from the principal faces of the slab light pipe. This light is intensity modulated by the image information recorded on the coating 20 according to the embodiments set forth above. Image information near the bottom of the slab light pipe further modulates light which has already been modulated by image information in the upper parts of the slab light pipe. The possibility of information loss or information crosstalk is effectively eliminated by the highly diffuse nature of the illumination however. This light leaves the slab light pipe in a broad prismatic envelope and is recorded on the holographic surface.

The coating 20 on the slab light pipes could be a photochromic material that changes index of refraction or attenuation or both when exposed. It could also be, for example, a gelatin emulsion whose attenuation changes upon exposure. Another suitable material would be a gelatin emulsion which has been bleached, tanned, and the unhardened gelatin removed after exposure. Hence, there would be a gelatin coating where the emulsion was exposed, and elsewhere there would be no coating. Such a gelatin emulsion is common in the art of photolithography and may be easily dyed to make it light absorbing. The coating on the slab light pipes could indeed be any material capable of accepting an attenuating or phase modulating image that would occur to one skilled in the art. It need not be itself light sensitive, but if not it must be capable of accepting an image from another imaging material.

The material of the base 18 could be plastic or glass depending upon the number of a slab light pipes to be utilized and the coating to be placed on the base. However, the radius of curvature of any departure from flatness should probably be very large compared to the slab thickness in order to prevent distortion of information for a particular document.

Figure 4:
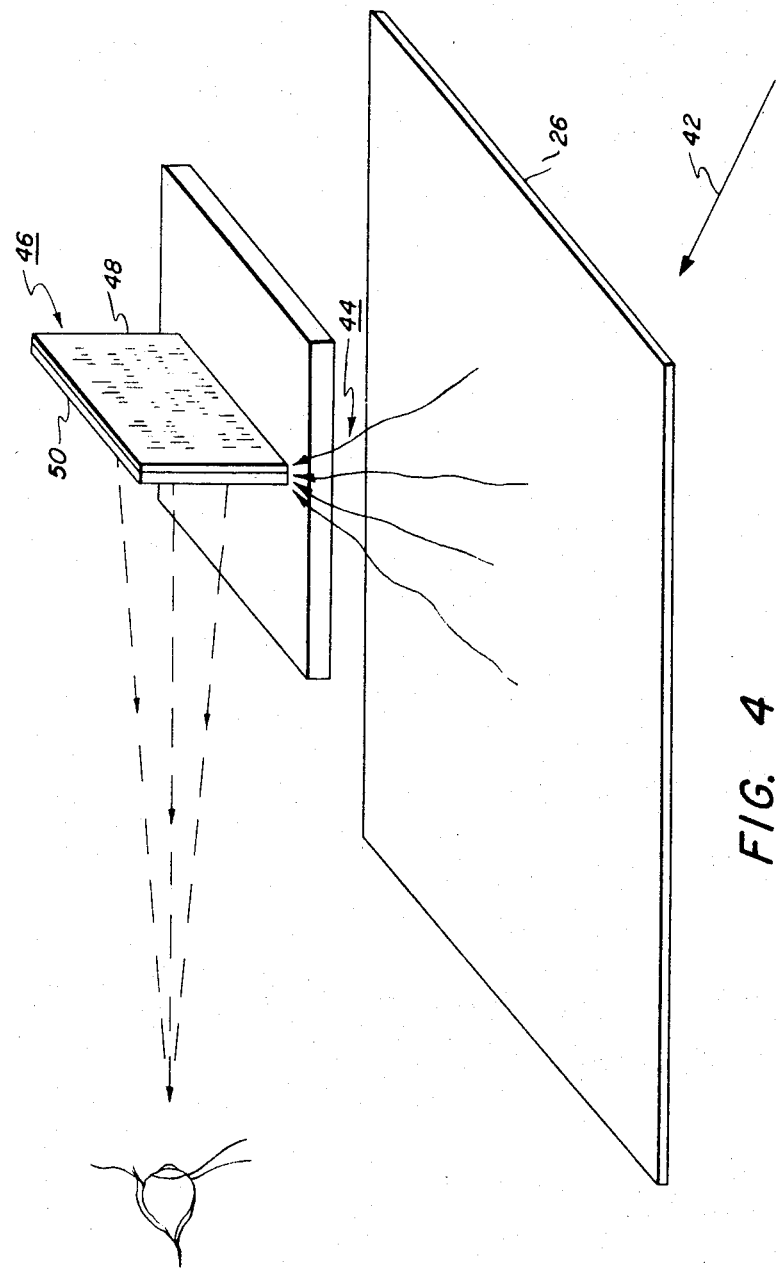
FIG. 4 is a diagram showing an output slab light pipe receiving the holographic image from the hologram in the presence of a reconstructing coherent light beam.

To retrieve the stored information the system shown in FIG. 4 is used. This system uses a single slab light pipe 46 comprising a transparent slab 50 with a special coating 48 on one surface. The hologram 26 is illuminated by a beam of coherent light 42, identical to and at the same angle to the hologram as the reference beam 32 used to make the hologram in FIG. 2 but propagating in the opposite direction. This will create a real image wavefield identical to that which came from the stack of slab light pipes during exposure, but propagating in the opposite direction.

To reconstruct a given image, a readout slab light pipe is placed in a position corresponding to that occupied by the input slab light pipe containing the given picture during recording. The reconstructed wavefronts 44 will enter this output slab light pipe and the recorded image will appear on the coated surface of the readout slab light pipe. In forming this image, areas corresponding to those which attenuated light on the input slab light pipe will receive less light or no light, corresponding to the amount of that attenuation. This image is not a useful image directly, however, since none of the light leaves the viewing surface face due to total internal reflection. The purpose of the coating 48 is to form a viewable light image. The simplest coating for the output slab light pipe is a thin layer of fluorescent material having the same index of refraction as the base material 50. This will reradiate nearly isotropically at a longer wavelength when illuminated. The intensity of reradiation will be proportional to the illumination intensity. Hence, the reconstructed image of the desired picture can be viewed on the surface of the output slab light pipe in a longer wavelength.

The trapped image could also be removed directly from the inside surface of the output slab light pipe by frustrated total internal reflection. This would be done by placing the surface of a transparent block having an index of refraction similar to that of the base within a fraction of a wavelength of the surface of the base. Any desired amount of light could then be leaked out for viewing on a ground glass surface, for example. The output image may then be easily magnified by any inexpensive optical system for reading by an observer.

A third way to remove the trapped image is to use a coating 48 having either random or regular surface or volume optical inhomogeneities that will cause a portion of the trapped light to be scattered or diffracted at such an angle that it can leave the slab light pipe. Such optical inhomogeneities could affect the phase, amplitude or polarization of the trapped light.

Numerous other techniques for removing the trapped light will suggest themselves to one skilled in the art. These include but are not limited to techniques in which the trapped light modifies various optical properties of coating 48 or modifies various electrical properties of coating 48 which may in turn be used to modify optical properties of the same or a nearby coating. The optical properties so modified may then be used to modify a second light source or to enable or to inhibit an optical emission as in electroluminescence. The modified electrical properties may also be used to modify a scanned electron beam, as in a vidicon, allowing an electronic reconstruction of the trapped light distribution.

In practice the single output slab light pipe would probably be supported on the uncoated side with a rigid structure. This must be mounted over an optical flat 44 if one was used in the recording process as seen in FIG. 2. The dimensions would be identical to those of an input slab light pipe seen in FIG. 3.

Thus, it can be seen that the invention as herein described produces suitably large reconstructed images. The image data is recorded redundantly on the hologram, making it nearly immune to accidental loss. The limited hologram aperture problem has been solved herein by turning the end surface of a picture plate towards the hologram plate during exposure. This occupies an angular aperture hundreds of times smaller than the image surface itself, allowing many more pictures to be recorded on the holographic surface. Image retrieval is obtained by simple linear motion of the readout slab light pipe, much like a microfilm system.

The invention may be extended to the construction of the hologram by three separate light frequencies, either by three coherent light sources or one or more sources emitting the three frequencies. Upon readback of the hologram with the same light frequencies, a color image may be obtained, if the recorded picture was in color.

In the foregoing there has been disclosed apparatus for effectively utilizing a holographic recording technique in a high density information recording system. In the specification herein, specific dimensions have been discussed with regard to the input and output slab light pipes, but it is obvious that such dimensions could change in accordance with the amount of information to be recorded and the size of the holographic surface. Further, the invention has been described in the recording of pictures or documents on input slab light pipes. However, as would be apparent to one skilled in the art, any information which is capable of being recorded on such a slab light pipe may be utilized in accordance with the principles of the present invention. Therefore, while the invention has been described with reference to specific embodiments, it will be understood by those skilled in the art that various changes may be made and equivalents may be substituted for elements thereof without departing from the true spirit and scope of the invention. In addition, many modifications may be made to adapt to a particular situation without departing from the essential teachings of the invention.

What is claimed is:

1. A high density holographic data storage and retrieval system comprising
    a plurality of surface recorded base members in a stacked arrangement, each of said base members comprising a flat transparent support base and a light sensitive coating on one side thereof, said light sensitive coating being recorded thereon in accordance with a picture or the like to be recorded,
    a source of coherent light illumination,
    means for diffusing part of said coherent light illumination and presenting said diffused light illumination to one edge of said plurality of base members, said light being modulated by the images on said light sensitive coatings by internal reflection in said transparent support bases and exiting said transparent support bases at the opposite edges thereof, and
    holographic recording means adjacent said opposite edges of said plurality of surface recorded base members for recording said modulated light in the presence of the coherent light illumination.

2. The system as set forth in claim 1 further including
    a second source of coherent light illumination impinging upon said holographic recording means for retrieving said recorded data,
    at least one readout base member, said readout base member comprising a flat transparent support base and a coating on one side thereof for producing an output optical image waveform in response to said second light illumination, said readout base member being positioned adjacent said holographic recording means at the same position as was a similar surface recorded input base member to reproduce the image recorded from said surface recorded base member.

3. The system as set forth in claim 2 further including
    an optical flat surface means on said opposite edges of said plurality of surface recorded base members to provide an accurate optical finish to said edges.

4. The system as set forth in claim 2 wherein said support bases are glass.

5. The system as set forth in claim 2 wherein said support bases are plastic.

6. The system as set forth in claim 2 wherein said light sensitive coating is a photochromic material.

7. The system as set forth in claim 2 wherein said coating on said readout base member is a fluorescent material.

8. A high density holographic data retrieval system including a hologram comprised of the light image from a plurality of input record surfaces, comprising
a source of coherent light illumination impinging on said hologram,
a readout base member positioned adjacent said hologram at the same position as was a similar input record surface to receive the holographic modulated light from said hologram and reproduce the image received therefrom, said readout base member comprising a flat transparent support base and a coating thereon to produce an output optical image waveform on the fore of said coating in response to said holographic modulated light.

9. A method of high density holographic recording comprising the steps of:
imaging a plurality of documents or the like on a plurality of surface recording base members,
stacking said base members so that the images thereon are transverse to the axis of the stack thereof,
illuminating one longitudinal surface of said stack with diffuse coherent light rays, and
recording on a holographic plate placed adjacent the opposite longitudinal surface of said stack the information modulated light exiting from said stack in the presence of coherent light rays.

10. The method as set forth in claim 9 further including demagnifying the images of said documents or the like prior to said step of imaging.

11. The method as set forth in claim 9
finishing said opposite longitudinal surface of said stack to provide an optical finish thereon.

12. The holographic product of the method of claim 9.

13. A method of high density holographic data storage and retrieval comprising the steps of:
recording the light images of a plurality of documents or the like on light sensitive coatings on a plurality of input surface recording base members, said base members being essentially rectangular with parallel input and output edges,
stacking said base members so that the images thereon are perpendicular to the axis of the stack,
illuminating the longitudinal surface of the input edge of said stack of base members with diffuse coherent light rays,
recording on a holographic plate placed adjacent the output edges of said stack of base members the information modulated light exiting from said output edges in the presence of coherent light rays,
further illuminating said recorded holographic plate with further coherent light rays propagating in the opposite direction from said first mentioned coherent light rays, and
placing a readout base member adjacent said hologram at the same position as was a similar input recording base member to receive the holographic modulated light from said hologram and reproduce the image received therefrom.

* * * * *